May 11, 1948.　　　　E. L. SINCLAIR　　　2,441,335
METHOD AND APPARATUS FOR CONTACTING GASES AND SOLIDS
Filed July 31, 1941
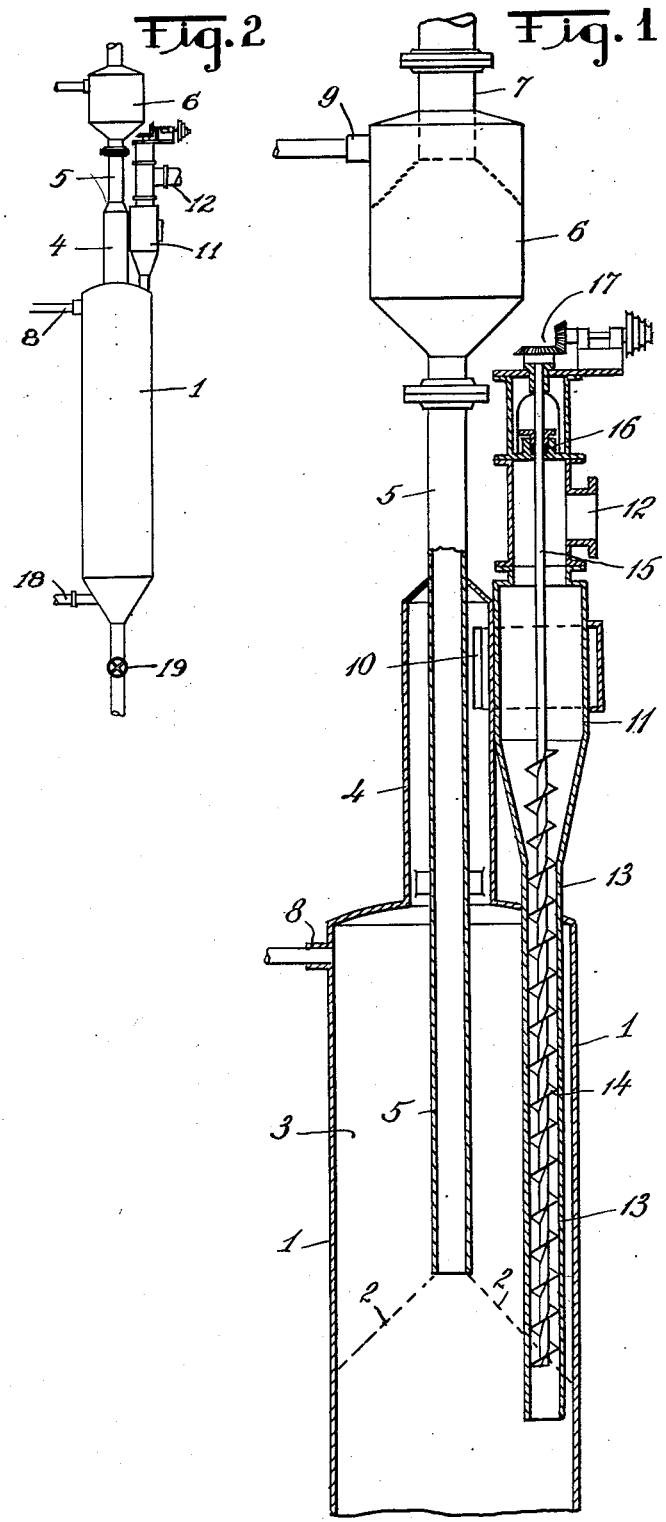
Edward L. Sinclair
INVENTOR
BY
ATTORNEY Patented May 11, 1948

2,441,335

UNITED STATES PATENT OFFICE 2,441,335

METHOD AND APPARATUS FOR CONTACTING GASES AND SOLIDS

Edward L. Sinclair, Philadelphia, Pa., assignor to Socony-Vacuum Oil Company, Incorporated, a corporation of New York Application July 31, 1941, Serial No. 404,800

2 Claims. (Cl. 23—1)

This invention has to do with the separation of entrained solid matter from gases effluent from processes wherein solid material in granular or particle form has been subjected to treatment by contact with gases or vapors.

Typical of such processes are those wherein spent fuller's earth is regenerated by flowing it in a stream through a reaction zone wherein it is contacted in countercurrent with a stream of regenerating gas, as in Payne, U. S. Patent 2,227,416. Similar processes wherein the object is the vapor phase conversion of hydrocarbons in the presence of a particle form solid contact mass which may constitue or may carry a material catalytic to the conversion being practiced are known. In all of these, as well as in processes like Payne, the separation of solid particles from effluent gases is necessary. This is particularly true with processes where the space velocity of treating gases or vapors per pound of solid material is quite high, whether the bed of solid material be fixed or moving, and is most necessary with moving beds of solid particles, as with Payne, or with processes of hydrocarbon conversion operated in the same fashion for the contacting of hydrocarbon vapors with moving beds or flowing streams of solid catalytic contact mass particles.

This invention has for its object the provision of a convenient and highly adaptable form of construction for such purposes, particularly adaptable for use in conditions where gases are being handled at high space velocities. A further object is the provision of apparatus capable of insuring a positive return of separated solid material to the reaction zone.

In order to understand this invention, reference is made to the drawing attached hereto the two figures of which show, in somewhat diagramatic form, the apparatus of the invention as installed upon a rather small reactor.

In the drawing, 1 denotes the shell of a vertical, cylindrical reactor in which a downwardly flowing stream of solid particles is being contacted with an upwardly flowing stream of gases or vapors, hereinafter spoken of as gas. The reactor is filled to a level indicated by dotted line 2 by the solid material by means later described. In the solid material below line 2 there may be, and in fact usually are, embedded heat exchange medium tubes, baffles for insuring proper contact of solid and gas and other structures, not here shown. Also, some construction is usually afforded, at a point somewhat below 2 to accomplish at least a partial separation of gas from solid, but since the structure has little pertinence in connection with the present invention it is not shown. It suffices to say that line 2 designates the upper surface of the bed of solid entering into and passing through the zone of reaction, and that in disengaging space 3, gases and entrained solids emergent from that reaction are given a preliminary separation whereby heavier particles fall back to the solid bed. Above disengaging space 3 there is installed a gas neck 4, and solid material feed pipe 5 extends centrally and upwardly through space 3 and neck 5 to finally support upon its external upper end a solid material feed hopper 6 which is fed from an external bin, not shown, through pipe 7. Connections are provided at 8 and 9 in space 3 and hopper 6 so that, regardless of the absolute pressure existing in the reactor, the differential pressure between 3 and 6 may be so adjusted as to permit a proper rate of feed of solid material through pipe 5.

Returning to the gases and entrained solid material, they are passed from disengaging space 3 through gas neck 4 and from thence through a slot or slots 10 into a cyclone separator 11. This cyclone separator 11, operating in the usual manner, serves to separate entrained solid material from the effluent gases. The gases depart from the apparatus to disposal or to further processing through outlet 12, while the separated solids collect in the lower portion of separator 11. From the lower portion of the separator 11 there depends a leg or boot formed by pipe 13, which extends into reactor 1 to a point below the level of the solid material therein. Within this pipe 13 there is a screw conveyor 14 mounted upon shaft 15 which shaft is suitably journaled through the top of separator 12 at 16 and is driven at a suitable speed by external driving means 17. In operation this conveyor serves to positively convey separated solids downwardly into the reaction zone, and, discharging below the level of solids therein, effects a positive seal. This feature is particularly useful in operations wherein high space velocities are used, since in such cases, the solids in the reactor all but "float" upon the rising gas current and bypassing into the separator is frequently avoided with difficulty, and return of fine separated solid material from the separator is always difficult. Obviously other forms of positive conveying means may be substituted for the helix 13, although the helix is the simplest and most effective. Also, it is obvious that the pipe 13 need not be located centrally of the separator 12, though such construction is easiest and best.

In Figure 2, there is shown the whole of the reactor, showing how the gas medium may be introduced at 18 to flow through reactor 1 and be removed at 12, and also showing a rate of solid flow control at 19, by which the reactor may be maintained full of the solid up to that level determined by the pipe 5, as shown in Figure 1.

I claim:

1. That method for conducting operations wherein a gasiform medium is contacted with a contact mass composed of a collected bed of solid particles comprising the steps of: passing said gas in contact with the particles of said bed at velocities not disruptive of said bed, effecting an initial disengagement of gas and solid in a space above said bed and partially defined by a surface of said bed and at gas velocities insufficient to support a contact mass particle of average size, effecting a second separation of gas from particles of less than average size entrained therein, and forcibly returning said separated entrained finer solids to a point within said contact mass body and below that top surface thereof which partially defines the primary disengaging space.

2. In an apparatus for contacting a particle form solid with a gasiform medium, a reactor vessel, a conduit for feeding particle form solid material thereinto extending through the top of said vessel and terminating at a level below the top of said vessel, means to withdraw solid material from the lower end of said vessel, flow throttling means associated with said withdrawal means to control the rate of solid flow so as to maintain said vessel substantially filled with said solid material to the level of said solid feed pipe, means to introduce gaseous medium into said vessel at a level near its lower end, a gas exit nozzle connected to said vessel at a level above the lower end of said solid material feed pipe, a gas-solid separator positioned outside said vessel, conduit means connecting said gas outlet nozzle to said gas-solid separator, a tube leading from the fine solid collection space of said separator to a point within said vessel below the lower end of said solid material feed conduit and means in said tube to force fine solid material therethrough into said vessel.

EDWARD L. SINCLAIR.

REFERENCES CITED

The following references are of record in the file of this patent:

UNITED STATES PATENTS

| Number | Name | Date |
|---|---|---|
| 1,799,858 | Miller | Apr. 7, 1931 |
| 1,984,380 | Odell | Dec. 18, 1934 |
| 2,000,972 | Manross | May 14, 1935 |
| 2,148,981 | Dundas | Feb. 28, 1939 |
| 2,152,367 | Smith | Mar. 28, 1939 |
| 2,157,775 | Smith | May 9, 1939 |
| 2,213,668 | Dundas | Sept. 3, 1940 |
| 2,226,578 | Payne | Dec. 31, 1940 |
| 2,248,196 | Plummer | July 8, 1941 |
| 2,253,486 | Belchetz | Aug. 19, 1941 |
| 2,353,098 | Whitely, Jr. | July 9, 1944 |

FOREIGN PATENTS

| Number | Country | Date |
|---|---|---|
| 23,045 | Great Britain, 1910 | Aug. 24, 1911 |